Nov. 20, 1923.  1,475,065
A. GILBERTSON
DEVICE FOR SECURING AND TIGHTENING ANTISKID CHAINS
Filed Dec. 14, 1922
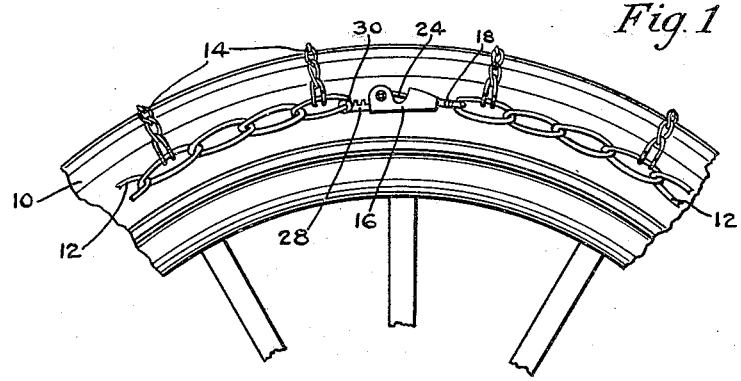
Fig. 1
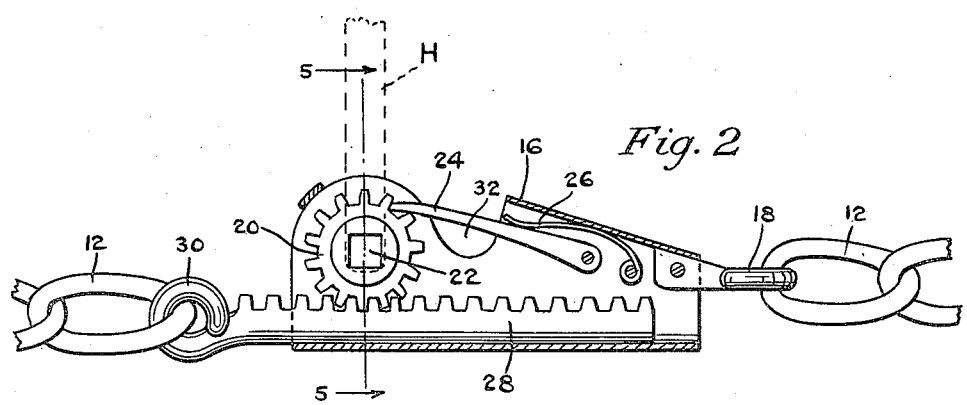
Fig. 2
Fig. 4
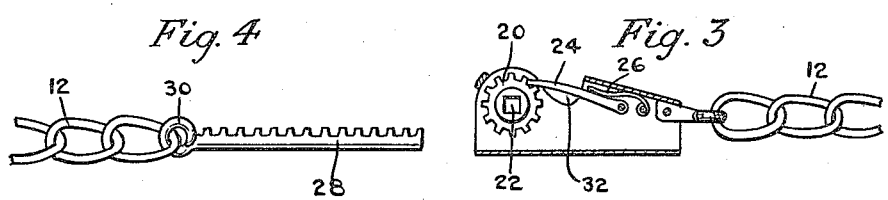
Fig. 3
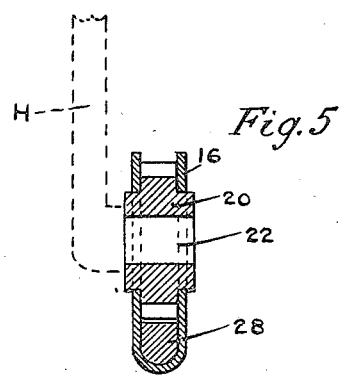
Fig. 5
Inventor:
August Gilbertson.
By Whiteley and Ruckman
his Attorneys.

Patented Nov. 20, 1923.

1,475,065

UNITED STATES PATENT OFFICE.

AUGUST GILBERTSON, OF MINNEAPOLIS, MINNESOTA.

DEVICE FOR SECURING AND TIGHTENING ANTISKID CHAINS.

Application filed December 14, 1922. Serial No. 606,936.

*To all whom it may concern:*

Be it known that I, AUGUST GILBERTSON, a citizen of the United States, residing at Minneapolis, in the county of Hennepin and State of Minnesota, have invented certain new and useful Improvements in Devices for Securing and Tightening Antiskid Chains, of which the following is a specification.

My invention relates to devices for securing and tightening anti-skid chains. An object is to provide a device which will hold an anti-skid chain snugly upon the tire of motor vehicle wheels so as to eliminate rattling and striking of the chain upon the mudguard. I am aware that prior to this time, it has been customary to provide anti-skid chains with springs tensioned across the same for this purpose. An object in particular is to provide a device which will act more directly upon the chain and which can be more readily attached and detached.

The full objects and advantages of my invention will appear in connection with the detailed description, and the novel features of my inventive idea will be particularly pointed out in the claim.

In the accompanying drawings, Fig. 1 is a side elevational view showing a portion of a wheel with my device applied to an anti-skid chain carried thereon. Fig. 2 is a longitudinal view of the device showing it connected to the two ends of an anti-skid chain. Fig. 3 is a longitudinal sectional view of one member of the device. Fig. 4 is a side elevational view of the other member of the device. Fig. 5 is a view in cross section on the line 5—5 of Fig. 2.

Referring to the drawings, the numeral 10 designates a tire upon which is mounted a customary anti-skid chain consisting of circular chain members 12 and cross-connecting members 14. Instead of hooking together the ends of the member 12 as is customary, I provide the following device for adjustably securing together the ends of this circular chain member. A casing 16 has secured to one of its ends a hook 18 which is adapted to be hooked to one end of the tire chain 12. Rotatably mounted in the side walls of the casing 16 near its other end as best shown in Fig. 5 is a pinion 20 having a square hole 22 centrally positioned therein. Pivotally mounted on the casing is a pawl 24 which is normally held by a spring 26 in engagement with the teeth of the pinion 20 to prevent backward movement of the pinion. A rack 28 is adapted to slide within the lower portion of the casing 16 and to be engaged by the teeth of the pinion 20. The outer end of this rack is formed into a hook 30 adapted to be hooked into the other end of the tire chain as will be understood by reference to Fig. 1. The casing 16 is partly cut away, as indicated at 32 in order that the pawl 24 may be readily lifted when it is desired to disconnect the two members of the device and remove the anti-skid chain from the tire.

The operation and advantages of my invention will be readily understood from the foregoing description. In the use of the device, it is sufficient to provide only one device for each anti-skid chain. The inner one of the circular chain members may be hooked together in the customary manner and the device applied to the outer circular chain member as shown in Fig. 1. Upon sliding the rack 28 into the casing 16, the pinion 20 will be rotated and backward rotation thereof will be prevented by the pawl 24. In order to obtain the desired degree of tightness of the anti-skid chain, a crank handle H may be employed, this crank handle as may be readily understood having a square end portion extending at right angles to the handle proper and this square portion being adapted to fit into the square hole 22 of the pinion 20. When the device is applied to one of the circular chain members 12, the corresponding chain member will be tightened also on account of the two chain members being connected by the cross members 14. As the anti-skid chain wears, it may be tightened from time to time as may be necessary by giving a partial rotation of the pinion 20.

I claim—

A device for securing and tightening antiskid chains comprising a casing, means at one end of said casing for attachment to one end of the chain, a pinion rotatably mounted in said casing, means carried by said casing for preventing said pinion from rotating backwardly, a rack adapted to slide in said casing with its teeth in engagement with the teeth of said pinion, and means carried by the outer end of said rack for attachment to the other end of the chain, said pinion having provision by means of which it may be rotated.

In testimony whereof I hereunto affix my signature.

AUGUST GILBERTSON.